US006414808B1

(12) United States Patent
Allenspach et al.

(10) Patent No.: US 6,414,808 B1
(45) Date of Patent: Jul. 2, 2002

(54) PATTERNING OF MAGNETIC MEDIA

(75) Inventors: Rolf Allenspach, Adliswil; Andreas Bischof, Langnau; Urs T. Duerig, Rueschlikon, all of (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/405,882

(22) Filed: Sep. 24, 1999

(30) Foreign Application Priority Data

Oct. 12, 1998 (EP) ............................................. 98811016

(51) Int. Cl.$^7$ ................................................. G11B 5/09
(52) U.S. Cl. ........................... 360/55; 360/131; 369/101
(58) Field of Search ................................. 369/101, 126, 369/13, 13.01; 360/55, 131, 133, 135; 204/192.2; 365/118, 128, 171; 428/694 T, 694 TP, 694 TR, 694 BR, 694 TM, 694 BA

(56) References Cited

U.S. PATENT DOCUMENTS

| | | | | |
|---|---|---|---|---|
| 3,929,604 A | * | 12/1975 | Shirahata et al. | ............ 360/131 |
| 4,748,592 A | | 5/1988 | Nagao et al. | |
| 4,888,758 A | * | 12/1989 | Scruggs et al. | ............. 369/101 |
| 5,546,337 A | | 8/1996 | Hurt et al. | |

FOREIGN PATENT DOCUMENTS

| | | |
|---|---|---|
| JP | 10-506494 | 6/1998 |
| WO | WO 95/20814 | 8/1995 |

OTHER PUBLICATIONS

B.D. Cullity, Introduction to Magnetic Materials, published Dec., 1972.*
S.S.P. Parkin, "The Magic of Multilayers", IBM J. Res. Develop., vol. 42, No. 1, Jan. 1998.*
Betzig et al., "Near–field magneto–optics and high density data storage", Appl. Phys. Lett. vol. 61 No. 2 Jul. 13, 1992, pp. 142–144.
.XP–002095958 , "McGraw–Hill Encyclopedia of Science & Technology", 1997, McGraw–Hill, New York, pp. 203–205.
XP–002095959, "CRC Handbook of Chemistry and Physics", 1993, CRC Press. Boca Raton, FL.
"Near–field magneto–optics and high density data storage", E. Betzig et al., Applied Physics Letters, Jul. 13, 1992, vol. 61, No. 2, pp. 142–144.
XP–002095957, "Planar patterned magnetic media obtained by ion irradiation" Science, Jun. 19, 1998, American Assoc. Adv. Sci., USA, vol. 280, No. 5371, pp. 1919–1922.

* cited by examiner

*Primary Examiner*—Alan T. Faber
(74) *Attorney, Agent, or Firm*—Marian Underweiser, Esq.; McGinn & Gibb, PLLC

(57) ABSTRACT

A method of generating or modifying patterns of topically specific magnetic modifications in an at least potentially ferromagnetic surface comprising the step of subjecting the surface to a controlled impact of energized subatomic particles, preferably in the form of electron radiation, directed at the surface for producing a predetermined pattern of discrete magnetized areas on the surface. The method serves to increase the density of magnetically coded information on magnetic media, such as hard disks.

24 Claims, 2 Drawing Sheets

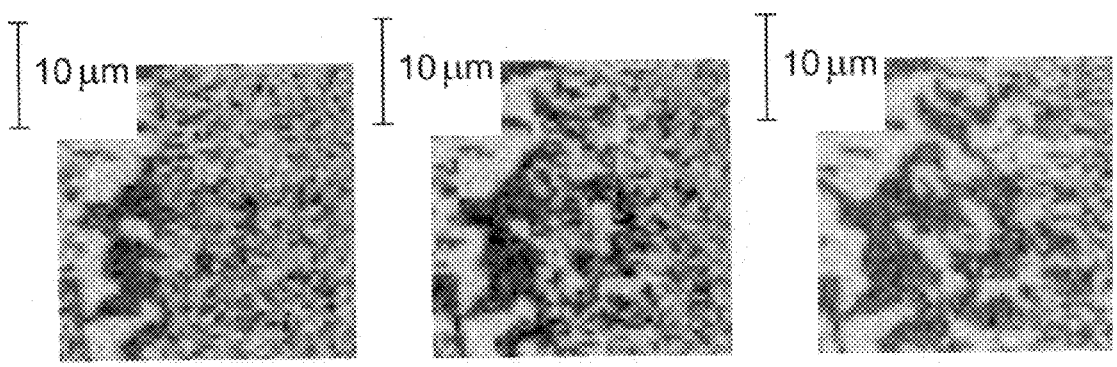
FIG.3A  FIG.3B  FIG.3C

PATTERNING OF MAGNETIC MEDIA

BACKGROUND OF THE INVENTION

1. Field of the Invention

The present invention is directed to a method of generating or modifying a pattern of topically specific magnetic properties in a planar magnetic surface and to magnetic storage devices comprising one or more surfaces provided with such patterns.

2. Discussion of the Prior Art

Magnetic devices for recording and storing electronic information have come a long way from magnetic tapes to current storage devices, such as state-of-the-art hard disks with capacities in the Gigabyte range.

Generally, increases of storage capacity in the past were due, at least in part, to an increase of the storage density, e.g. as expressed in terms of bits per square centimeter ($b/cm^2$). For example, the first magnetic disc introduced by IBM in 1956 had a storage density of about 300 $b/cm^2$ ($10^2$); a first "magic" threshold of 100 000 $b/cm^2$ ($10^5$) was reached about twenty years later. Currently, storage densities of hard disks and other commercially available planar magnetic media are in the range of hundred million $b/cm^2$ ($10^8$) so that even an "entry level" hard disc of an every-day computer has a storage capacity of several Gigabytes.

While it is expected that technological progress will generally continue at such rates, physical limits of the storage density of planar magnetic media can be predicted because of the finite size of the smallest magnetic entities, or "domains", and the limits of clear discrimination between the unit areas, i.e. the capability of clearly distinguishing between one stored bit and its immediate neighbors. In fact, an upper limit of the order of 10 Gigabits/$cm^2$ ($10^{10}$) could be expected because of the "paramagnetic limit" yet increases of storage density in redesigned planar magnetic devices of several orders of magnitude seem possible.

In an attempt to increase data storage density in magnetic recording, Chappert, C. et al (Science, 280 (1998), 1919–1922) in a report about planar patterned media (this report being incorporated herein for all purposes by way of reference,) have proposed to produce magnetic patterns by impacting cobalt-platinum (Co—Pt) sandwich structures and multilayers with ion irradiation, i.e. impacting with atomic particles, through a lithographic resist mask for magnetic patterning without significant modification of roughness and optical properties of the sandwich or multilayer structures. It has been argued that bombardment (this term being used synonymously with "irradiation" and including irradiation with confined or "narrow" beams as well as with broad beams) with such atomic particles changes the Pt concentration profile at each Co layer interface which suggests the possibility of locally changing magnetic properties by a technique similar in effect to that of semiconductor doping, i.e. by irradiation through a lithographically defined mask. A simple sandwich structure was irradiated at a fluence or dose of $10^{16}$ ions/$cm^2$ with 30 keV $He^+$ ions, i.e. a bombardment of sufficient intensity to make the irradiated area in the particular sample paramagnetic at room temperature.

The authors concluded that magnetic patterning induced by bombardment with such atomic particles would allow to create adjoining regions with differing magnetic properties, such as perpendicular versus in-plane magnetization, or paramagnetic, or stripe domain structures in an otherwise optically smooth film.

SUMMARY OF THE INVENTION

However, since both applicability as well as effectiveness of bombardment with atomic particles, such as ions, for magnetic patterning may be limited, it is a main object of the present invention to extend the possibilities of generating or modifying patterns of topically specific magnetic orientation in a planar magnetic surface, or film, and to provide improved magnetic storage and recording devices comprising one or more surfaces provided with such patterns.

We have found that this object and further improvements can generally be achieved according to the invention by subjecting magnetic materials to the impact of energized subatomic particles, namely electrons, neutrons or photons (X-rays). It has been found that such irradiation is capable of causing irreversible changes of magnetic properties, such as magnetic anisotropies as well as domain pinning behavior.

Further, we have established that bombardment with energized subatomic particles, notably in the form of electron radiation, can be used advantageously to magnetically pattern films by irradiating the material either by a narrow or broad beam of subatomic particles, or by shining such a beam through a layer of a material that is substantially opaque to the radiation used except for openings where the radiation is to impact the layer to be treated according to the invention, e.g. a shadow mask or a patterned resist, such as patterned by lithographic means.

The method according to the invention can be extended to include sequential patterning of multilayer films as they are grown in order to optimize their magnetic properties. In view of considerations of energy exchange properties, it is expected that energized subatomic particles other than electrons, i.e. high-energy photons such as X-ray radiation, as well as energized neutrons, will be of similar utility according to the invention as electron radiation.

Thus, according to a first general aspect, the invention provides for a method of generating or modifying a pattern of topically specific magnetization including but not limited to magnetic spin orientation in a surface of a material, preferably in the form of a thin or ultrathin layer, which material is, at least potentially, ferromagnetic; the method according to the invention comprises the step of subjecting the surface to a controlled impact of energized subatomic particles directed at the surface for producing a predetermined pattern of discrete magnetized areas on the surface.

According to a second general aspect, the invention provides for novel magnetic recording or storage devices, such as hard disks or readers for magnetically coded information comprising at least one magnetic surface provided with a pattern of topically specific modifications in a ferromagnetic surface. The pattern comprises a plurality of magnetic domains obtainable by impacting the surface with energized subatomic particles selected from the group consisting of electrons, photons, and neutrons; in a preferred group of such magnetic devices the discrete magnetized area has a largest planar dimension in the order of 0.1–5 $\mu m$.

The following definitions of terms believed to be essential for understanding the invention will be used herein:

The term "topically specific" is intended to refer to a specific site, or plurality of specific sites (also termed "pattern"), on and in a surface which may be positioned substantially at the top of an electronic recording and/or storage device structure so as to form an interface with the surrounding atmosphere or with a lubricating outermost layer of the type known per se in the art; alternatively, the site or pattern may be situated in a stack of layers of an electronic recording and/or storage device structure, it being implied that such structures are formed of normally solid materials.

The terms "magnetization" and "magnetic modification" are intended to include any type of magnetic orientation, or change of a given magnetic orientation, in a material that is, or can be made, magnetic. A magnetic modification also includes but is not restricted to a change from one magnetic state, e.g. ferromagnetic or ferrimagnetic, into any other magnetic state or nonmagnetic state, such as paramagnetic, and vice versa comprising at least one magnetic surface provided with a pattern of topically specific modifications in a ferromagnetic surface, said pattern comprising a plurality of magnetic domains obtainable by impacting said surface with energized subatomic particles selected from the group consisting of electrons, photons, and neutrons.

For brevity, the term "ferromagnetic" will be used herein to include magnetic sites or surfaces formed of either ferromagnetic or ferrimagnetic materials.

A "controlled impact of energized subatomic particles", or "radiation", according to the invention is intended to refer to controlling essentially all parameters of impacting a surface with energized subatomic particles as specified, i.e. electrons, photons and neutrons, generally in the form of beams of radiation, including control of the source of emission or radiation as well as any changes, or avoidance of changes, between the emitter (i.e. particle generator) or radiation source, and the target, i.e. the site or plurality of sites at the surface; also, this term includes at least some control of the site or sites of impact, e.g. by directional control of particle emission or radiation and/or masking.

A "predetermined pattern of discrete magnetized areas" is intended to refer to a generally regular arrangement of a multiplicity of areas in a specific state of magnetization, such as a plurality of ferromagnetic sites or "islets" distributed in an essentially regular manner within a planar continuum or "sea" which is in a magnetically different state, e.g. not ferromagnetic or having a different orientation. In a typical predetermined pattern or arrangement of discrete magnetized areas, a multiplicity of linear or circular bands formed of generally isomorphous, e.g. rectangular, polygonal or circular ferromagnetic, or ferrimagnetic areas or "spots" separated from each other by intermediate areas where the adjoining surface is not ferromagnetic.

The term "energized subatomic particles" is intended to encompass particles with an atomic mass of not more than 1 and having an energy which may differ for the different types of subatomic particles; for example, a suitable energy range for electrons is in the range of from about 100 eV to about 100 keV with a preferred range between about 0.5 and about 20 keV; a suitable energy range for photons is in the range of from about 20 eV to about 50 keV with a preferred range between about 100 eV and about 5 keV; for neutrons, a suitable energy range is between about 10 meV and about 1 MeV.

It will be noted that the terminology as regards magnetic states as well as materials which normally exist, or are capable of existing, in such states are well known in the art, e.g. Cullity, B. D., Introduction to Magnetic Materials, Addison Wesley, 1972 and do not require specific exemplification.

BRIEF DESCRIPTION OF THE DRAWINGS

The attached drawings are used to illustrate and not to limit the invention by means of specific examples. SEM stands for scanning electron microscope. In the drawings:

FIG. 1$a$ represents the in-plane, FIG. 1$b$ the out-of-plane magnetization component; the centered region shows complete change from being magnetized parallel to being magnetized perpendicularly to the surface; image size is 35 gm×35 $\mu$m;

FIGS. 3$a$, 3$b$ and 3$c$ show a sequence of perpendicular magnetic domain images, again taken micrographically by spin-polarized SEM, after scanning the rectangle on the left for 90 s with a beam current of 10 nA; the image sequence a–c shows repeated images taken with a reduced beam current of 1 nA; the perpendicularly magnetized phase evolves from the phase nucleated with increased beam current and finally fills the entire scanned area; the original film was magnetized in-plane; image size is 28 $\mu$m×28 $\mu$m.

DETAILED DESCRIPTION OF PREFERRED EMBODIMENTS OF THE INVENTION

Figure 1A:
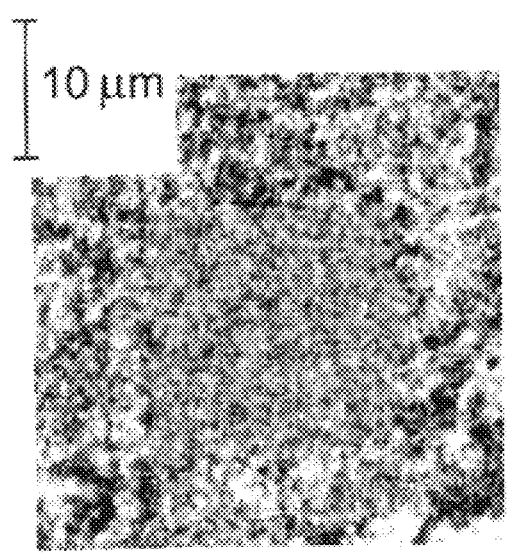
FIGS. 1$a$, 1$b$ are magnetic domain images taken micrographically by spin-polarized SEM after electron bombardment of a centered square for 1200 s.

According to a first and generally preferred embodiment of the invention, the surface treated by impacting it with energized subatomic particles is the surface, optionally situated at an interface with another layer of a normally solid material, such as in a multilayer device, of a generally ferromagnetic material which may be selected from normally solid elemental metals, metal alloys, and metal compounds including intermetallic compounds as well as compounds of metals with non-metallic elements. A preferred group of metals are the 3$d$ transition metal elements, such as Fe, Co, Ni, Mn, Cr, Cu and rare earth metals, such as Gd, Th and Y. Also, oxygen containing compounds of the metals just mentioned, e.g. the metal oxides can be used instead of, or in combination with, the elemental metals.

According to another preferred embodiment, the surface treated by the impact of energized subatomic particles according to the invention is provided by a very thin layer, e.g. having a thickness of not more than 100 monolayers (ML for short) and preferably 1–10 ML.

For use in storage devices of the hard disc type and similarly designed magnetic media, the surface treated by impacting it with energized subatomic particles according to the invention is provided on a substrate which is not ferromagnetic. Typical but not limiting examples are normally solid substrate materials including metals, semiconducting materials, insulating inorganic materials, and organic polymer substances. Selection of the type of substrate material and its specific properties depend, of course, upon the type of application, or magnetic device, respectively, but such selection is believed to be well within reach of those experienced in the pertinent art and requires no exemplification herein.

Alternating layers of a ferromagnetic metal and a non-ferromagnetic substrate may be arranged as a multilayer for treatment with energized subatomic particles according to the invention.

Another preferred embodiment of the invention is patterning of a thin template layer which imparts its magnetic structure to subsequent layers via exchange or dipolar coupling of the type known per se, cf. for example, Parkin, S. S. P.; IBM Journal of Res. and Develop., 42,(1988) 3.

In a further preferred embodiment of the invention the size of the bits in hard disk media is predefined by impacting with energized subatomic particles according to the invention in order to separate each bit from adjacent bits and thus reducing magnetic interaction between the bits.

For reasons of effectiveness, availability of suitable radiation sources, ease of control, and similar factors, electron radiation at an energy level of from about 100 eV to about 100 keV is the preferred form of energized subatomic particles for many applications of the invention.

According to a yet further embodiment, the invention can be applied to better define, or reduce, the active area in sensor applications, e.g. detector devices for reading magnetically encoded data.

DETAILED DESCRIPTION OF PREFERRED EMBODIMENTS OF THE INVENTION

In the art of producing magnetic recording and storing media, use of thin or ultrathin films is conventional and magnetic anisotropy is known to be a key ingredient of ferromagnetism in such ultra thin films because it is ultimately responsible for stabilization of the ferromagnetic phase. Consequently, changing magnetic anisotropy can be utilized as a tool for tuning magnetic properties in magnetic media for data recording and storage.

A prominent modification of magnetic anisotropy is that accompanied by a change of the easy magnetization direction. An increase of the perpendicular magnetic surface anisotropy can lead to a complete reorientation of the magnetization from parallel to perpendicular relative to a film surface. As is known in the art, it can be induced by depositing metal layers or by annealing. Switching within the plane is also provoked by chemisorption of gases in Co/Cu systems. Ion etching, on the other hand, is known to have the opposite effect of reducing perpendicular anisotropy. On a local scale, modification of the magnetic properties is known to be induced by small amounts of metallic adsorbates and by selective ion bombardment as mentioned above.

Now, it has been found according to the invention that modification of magnetic properties on a local scale is possible by irradiation according to the invention without adding or removing atoms, ions, or molecules. In the following examples, the electron beam of a conventional scanning electron microscope (SEM) was used as a means to "write" modified magnetic properties into an ultra thin Co film as explained in more detail below. In this way, the direction of magnetization is forced to change locally and the sizes of magnetic domains can be expanded by up to one order of magnitude. Possible origins of induced change of magnetic properties achieved by radiation according to the invention are discussed in connection with the examples, however, without wishing to be bound to any theory.

EXAMPLE 1

Films of Co were grown by molecular beam epitaxy at a rate of 0.5 to 1 ML/min, one ML having a thickness of 0.205 nm. Growth was effected on a Pt single-crystal as a substrate kept at room temperature (20–25° C.). Substrate preparation was as described in Grütter, P. and Dürig, U., Phys.Rev. B 49, 2021 (1994). The Pt substrate is nominally oriented along the (111) direction.

The data presented all refer to a Co film thickness of 3.8 ML. At such a film thickness, the direction of magnetization can be at any angle from parallel to perpendicular relative to the surface, depending upon the roughness of the substrate expressed as the density of monoatomic steps.

All local modifications leading to changes of magnetic properties were generated by the electron beam of the SEM complemented by a spin polarization analysis of the secondary electrons (cf Allenspach, R.; Physics World 7 No. 3 (1994) 44) with an operating voltage of 10 keV. A maximum beam current at the sample position of 10 nA was achieved by removing the aperture of the microscope objective. Total exposure times were varied from 10 to 1200 s. Magnetic images were taken with beam current of <0.3 nA unless specified otherwise. All experiments were performed at a pressure of $1 \equiv 10^{-10}$ mbar.

Figure 1B:
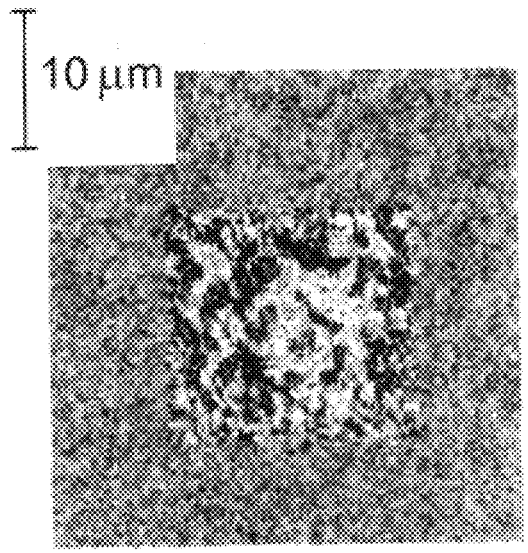

FIGS. 1a, 1b illustrate the principle of local magnetic modification; an area of 18 $\mu$m by 18 $\mu$m was scanned by the electron beam. Irradiation in this square area corresponds to a dose of $2.4 \equiv 10^{10}$ electrons per $\mu$m. The magnetic image of FIGS. 1a, 1b subsequently obtained at a lower magnification shows both the area treated according to the invention by electron radiation as well as the surrounding area. Within the center square of FIG. 1a and 1b, the direction of magnetization has switched completely from in-plane to out-of-plane as shown by the black/white contrast in FIG. 1b and the uniform gray level in FIG. 1a. The square decays into a demagnetized state of up/down domains having typical sizes of several micrometers. The film that was not treated by electron irradiation, on the other hand, consists of smaller domains magnetized in-plane.

Thus, FIGS. 1a, 1b exemplify an illustrative aspect of the invention: magnetic anisotropy can be enhanced by electron irradiation e.g. such that the magnetization changes its direction by large angles, up to and including a complete reorientation from parallel to perpendicular magnetization relative to the surface. Further, domain sizes can be enlarged by electron irradiation without application of an external magnetic field.

EXAMPLE 2

This example illustrates that the change in magnetic anisotropy caused by electron irradiation according to the invention can be estimated from the change in the direction of magnetization by a conventional mathematical model: the free energy E of the system is defined by $$E=(K_1-0.5\equiv\mu_0\equiv M_s^2+K_s/d)\sin^2\Phi+K_2\sin^4\Phi$$

wherein $K_1$ and $K_2$ are the first- and second-order bulk anisotropy constants of Co, $K_s$ is the surface anisotropy constant. $M_s$ is the saturation magnetization and d is the film thickness. In order to determine the angle $\Phi$ between magnetization and surface normal, a film was grown with an initially canted magnetization direction of 60° from normal. Upon electron bombardment with a dose of $\approx 1 \equiv 10^{10}$ electrons/$\mu$m$^2$ a complete rotation towards the perpendicular direction is obtained. Assuming constant values for the parameters related to bulk properties it can be deduced that the surface anisotropy has increased by at least about 30% from $K_s \approx 0.6$ J/m$^2$ to $K_s \approx 0.8$ J/m$^2$.

Figure 2:
FIG. 2 is a perpendicular magnetic domain image, again taken micrographically by spin-polarized SEM, after scanning four line segments arranged in a rectangular pattern of 3 $\mu$m length from top to bottom for 60 s; the induced domain size has increased in an extended region; image size is 15 $\mu$m×15 $\mu$m.

It could be expected that an increase of anisotropy beyond the minimum needed for stabilization of complete perpendicular magnetization would not lead to a detectable change of the magnetic images because the direction of magnetization already is fully perpendicularly. Surprisingly, this is not the case, however, as is apparent from FIG. 2: as can be seen from this figure, four vertical line segments, each having a length of about 3 $\mu$m, arranged in a rectangular pattern were written into the Co film as a consequence of electron irradiation.

The result of a local (or topically defined) electron irradiation with a dose of 2,5≡10$^{11}$ electrons/$\mu$m$^2$ is an increase of domain size from about 0,3–0,5 $\mu$m to >2 82 m. Both theoretical and experimental evidence reported in the literature have shown that the domain size of films with a completely perpendicular magnetization at thermal equilibrium depends upon anisotropy. Thus, it can be inferred that the increase of mean domain size is the result of a further increase in perpendicular anisotropy, and that the pinning strength of domain walls is reduced to such an extent that domain walls can propagate and actually reach equilibrium. Correspondingly, the modified areas decay into domains which maintain a locally demagnetized state.

Hence, irradiation by electrons according to the invention thus provides a means of modifying magnetic properties of magnetic media, such as ultra thin Co film on a scale of about 1 $\mu$m.

While not wishing to be bound by any specific theory for explaining the origin of the anisotropy increase due to electron irradiation, the following consideration is presented: according to the art, an increase of surface anisotropy in the Co/Pt system described could be attributed to reduced interface roughness or, alternatively, to formation of an alloy phase. Alloying at the interface has been reported in the art to occur at temperatures above 350 K. Structurally more perfect films exhibit larger surface anisotropies as well. We have observed that Ne$^+$ ion bombardment can reduce surface anisotropy and that the Pt step density is correlated directly to the magnitude of the surface anisotropy.

Specifically, it was observed experimentally that the yield of secondary electrons is reduced by about 2% in the entire area that has been modified magnetically, i.e. the film has undergone a change in work function, i.e. the energy required to displace an electron from the surface to infinity, within the modified area.

Since highly energized electrons are used conventionally to anneal materials, we have tested the temperature impact of the electron radiation used in the examples so as to exclude the possibility of annealing effects as a reason for the success of the inventive method but found that such increase was negligible (about 0.03 K). Consequently, annealing can be ruled out as a reason for the anisotropy change effected by the inventive method.

Generally, the upper limit of energy of the subatomic particles used according to the invention should be selected to preclude substantial thermal effects such as annealing. Thus, notably for purposes of optimization, energy levels should be controlled between a lower limit in view of effectiveness of the magnetic modification that is to be achieved and an upper limit for precluding undesirable thermal effects; such selection, however, is well within the competence of those experienced in the pertinent art.

Electron bombardment is known to increase exchange coupling across Fe/Cr/Fe films and these results were interpreted in terms of smoothing the Fe/Cr interfaces. In this connection, again, a long-distance effect of the electron beam extending to millimeters rather than to micrometers has been observed as a farther indication that the physics of the method according to the invention was not predictable from prior art knowledge.

EXAMPLE 3

This example is intended to support the theory that nucleation of a new structural phase is the most likely mechanism at work when treating a Co/Pt film according to the inventive method.

It was found that it is easier to expand an area that had been modified magnetically before than to create a new one. This is apparent from FIGS. 3a–3c.

In the series of micrographs shown in FIGS. 3a–c, the rectangular region on the left was treated by an intense electron beam (10 nA) until the magnetization direction pointed along the surface normal. Then, with a reduced beam current of 1 nA, the entire image was scanned repeatedly. The sequence of images shows that the perpendicularly magnetized phase evolves exclusively from the already existing perpendicular region. No new nucleation sites are created with the reduced beam current of 1 nA.

This would seem to support the assumption that nucleation of a new phase treated by irradiation according to the invention requires more energy than phase expansion. Whether this new phase is a modification of the Co film itself, or of its interface is not essential for practicing the inventive method. Both a reduced defect density within the film as well as a smoothed or intermixed interface are compatible with the evidence that the work function can be changed, to some extent at least in the entire magnetically modified area when practicing the inventive method.

Generally, the extent of magnetic modification as defined above that can be achieved according to the invention is large enough to permit application in various modified forms, and specifically the aspect of forcing the magnetization from a direction parallel to the surface to a fully perpendicular orientation, or vice versa. In films with perpendicular magnetization, magnetic domains can be expanded by the method according to the invention even without applying an external magnetic field.

While the above specific disclosure relates to the modification of magnetic anisotropies according to the invention in Co/Pt(111) films by electron bombardment on a micrometer scale, this is not intended to limit the invention. In fact, those experienced in the art will recognize many ways of applying the present invention to commercial production of various types of devices for recording and storage of magnetically coded information including, but not restricted to, the manufacture of hard disks and similar devices.

Accordingly, the scope of the present invention is not to be understood as being restricted to the above specific disclosure and examples but is to be construed from the following claims.

Accordingly what we claim is:

1. A method of patterning media, comprising:
   altering a magnetic property of a surface layer by subjecting said surface layer to a controlled impact of energized subatomic particles according to a predetermined pattern.

2. The method of claim 1 wherein said energized subatomic particles are selected from the group consisting of electrons, photons and neutrons.

3. The method of claim 1 wherein said energized subatomic particles comprise electrons having an energy in the range of from about 100 eV to about 100 keV.

4. The method of claim 1 wherein said energized subatomic particles comprise photons having an energy in the range of from about 20 eV to about 50 keV.

5. The method of claim 1 wherein said energized subatomic particles comprise neutrons having an energy in the range of from about 10 meV to about 1 MeV.

6. The method of claim 1 wherein said surface layer comprises a layer of a ferromagnetic material.

7. The method of claim 6 wherein said ferromagnetic material is selected from the group consisting of solid metals, metal alloys, intermetallic compounds, and metal compounds.

8. The method of claim 6 wherein said ferromagnetic material is selected from the group consisting of 3d transition metal elements, rare earth elements, oxygen-containing compounds of said elements, and alloys or intermetallic compounds thereof.

9. The method of claim 11 wherein said 3d transition metal elements are selected from the group consisting of Fe, Co, Ni, Mn, Cr, Cu, and rare earth elements.

10. The method of claim 8 wherein said rare earth elements are selected from the group consisting of Gd, Tb, Y, and mixtures, alloys or intermetallic compounds containing said rare earth elements.

11. The method of claim 6 wherein said surface layer is formed on a solid substrate selected from the group consisting of metallic substances, semiconducting materials, insulating inorganic materials, and organic polymer substances.

12. The method of claim 11 wherein said metallic substances are selected from the group consisting of noble metals, chromium, copper and alloys thereof.

13. The method of claim 11 wherein at an interface between said substrate and said surface layer, said substrate comprises a metal selected from the group consisting of noble metals, copper, and alloys thereof.

14. The method of claim 6 wherein said surface layer is formed at an interface of a multilayer structure.

15. The method of claim 1 wherein said surface layer is formed on a material having magnetic properties that differ from magnetic properties of said surface layer.

16. The method of claim 1 wherein said surface layer comprises a layer having a thickness of from about 1 to about 100 monolayers.

17. The method of claim 1 wherein said surface layer comprises a layer having a thickness of from about 1 to 10 monolayers.

18. The method of claim 1 wherein said subjecting comprises masking said surface layer with a layer that is opaque to said energized subatomic particles.

19. A method of generating or modifying a pattern of topically specific magnetic properties in a surface layer, comprising:

subjecting said surface layer to a controlled impact of energized subatomic particles directed at said surface layer for producing a predetermined pattern of discrete magnetized areas on said surface layer, wherein said surface layer is formed on a solid substrate comprising noble metals selected from the group consisting of gold, platinum, and alloys thereof.

20. A magnetic recording device comprising:

at least one magnetic surface having a pattern of topically specific modifications in a ferromagnetic surface, said pattern comprising a plurality of magnetic domains formed by altering a magnetic property of said surface by impacting said surface with energized subatomic particles selected from the group consisting of electrons, photons, and neutrons.

21. A hard disk comprising:

at least one magnetic surface having a pattern of topically specific modifications in a ferromagnetic surface, said pattern comprising a plurality of magnetic domains formed by altering a magnetic property of said surface by impacting said surface with energized subatomic particles selected from the group consisting of electrons, photons, and neutrons.

22. A reader for magnetically coded information comprising:

at least one magnetic surface having a pattern of topically specific modifications in a ferromagnetic surface, said pattern comprising a plurality of magnetic domains formed by altering a magnetic property of said surface by impacting said surface with energized subatomic particles selected from the group consisting of electrons, photons, and neutrons.

23. A hard disk comprising:

at least one magnetic surface having a pattern of topically specific modifications in a ferromagnetic surface, said pattern comprising a plurality of magnetic domains formed by altering a magnetic property of said surface by impacting said surface with energized subatomic particles selected from the group consisting of electrons, photons, and neutrons, wherein said plurality of magnetic domains comprises a plurality of discrete magnetized areas, each having a largest dimension in the order of 0.1–5 $\mu$m.

24. A reader for magnetically coded information comprising:

at least one magnetic surface having a pattern of topically specific modifications in a ferromagnetic surface, said pattern comprising a plurality of magnetic domains formed by altering a magnetic property of said surface by impacting said surface with energized subatomic particles selected from the group consisting of electrons, photons, and neutrons, wherein said plurality of magnetic domains comprises a plurality of discrete magnetized areas, each having a largest dimension in the order of 0.1–5 $\mu$m.

* * * * *